Nov. 17, 1959  J. M. ULANOVSKY  2,912,995
APPARATUS FOR INJECTING FLUIDS INTO FLUID STREAMS
Filed Dec. 27, 1954  3 Sheets-Sheet 1

INVENTOR.
JACK M. ULANOVSKY
BY
ATTORNEY

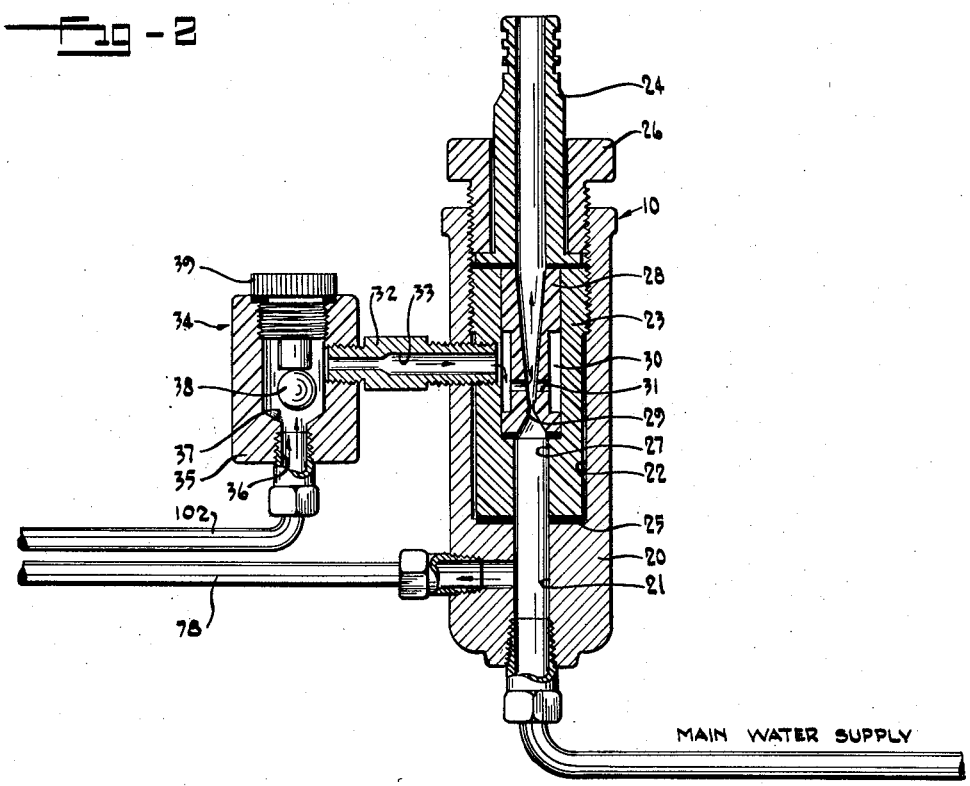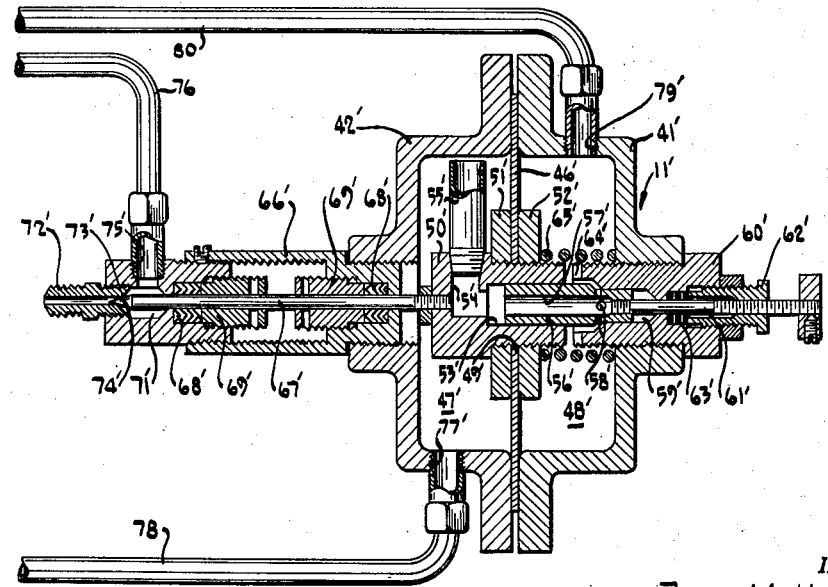

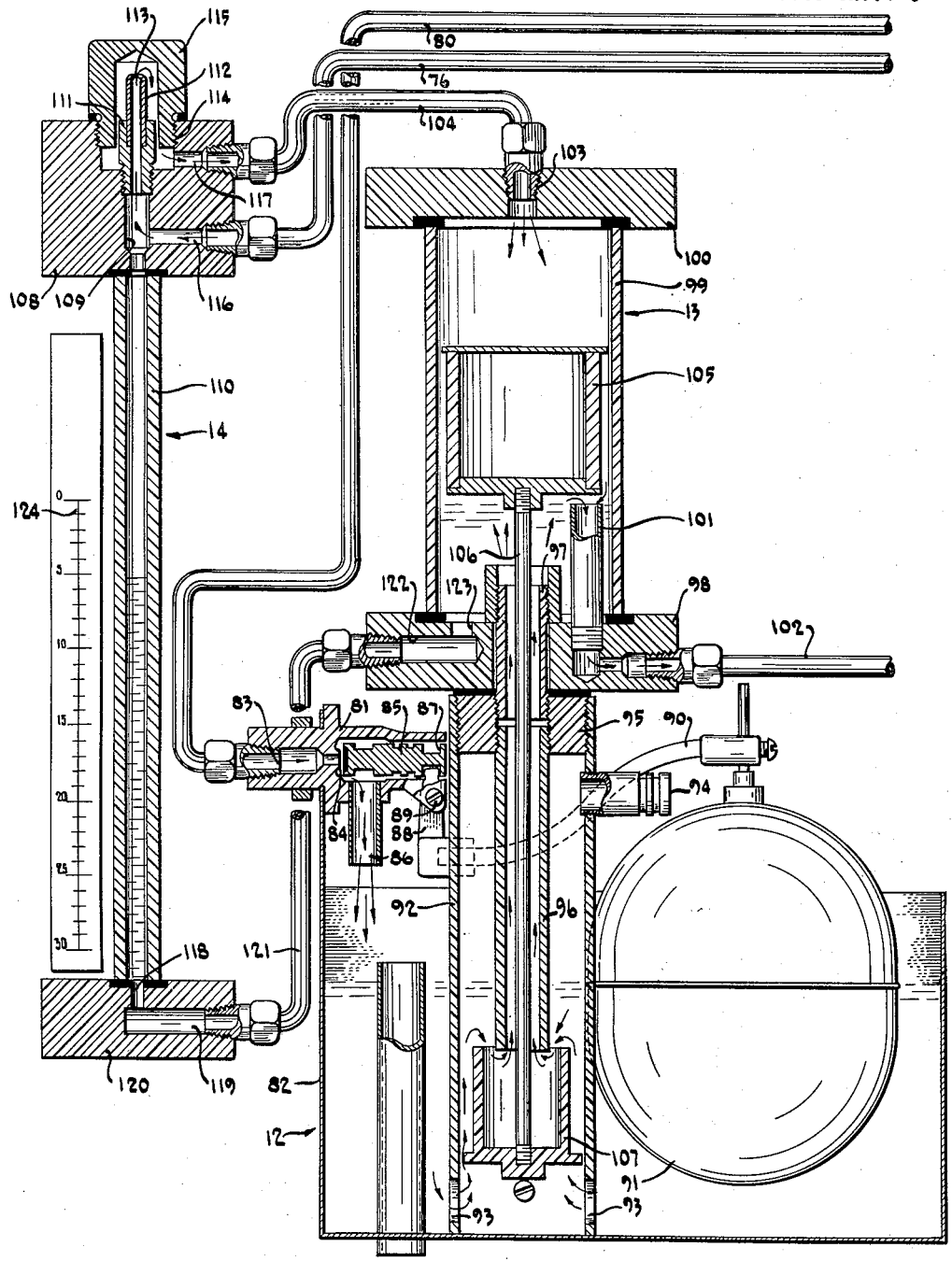

United States Patent Office 2,912,995
Patented Nov. 17, 1959

2,912,995

APPARATUS FOR INJECTING FLUIDS INTO FLUID STREAMS

Jack M. Ulanovsky, Los Angeles, Calif., assignor to Paddock Pool Equipment Co., Los Angeles, Calif., a corporation of California Application December 27, 1954, Serial No. 477,865

8 Claims. (Cl. 137—101.27)

The present invention relates generally to apparatus for regulating the mixing of a plurality of fluids, and in a particular illustrative embodiment, to such apparatus designed especially for injecting controlled quantities of chlorine into water flow systems for sterilization purposes.

The water flow system may comprise, for example, a city water system wherein water is conveyed by mains from a high pressure source to a point of use. In such applications, where the chlorinated water is intended for domestic use, the chlorine concentration of the water becomes extremely critical since too low a chlorine concentration provides ineffective germicidal action while too high a chlorine concentration is harmful to the human body.

A primary object of the invention then, is the provision of chlorinating apparatus for effecting the introduction of controlled quantities of chlorine into a water flow system whereby to provide at a downstream point of application a chlorine solution of predetermined chlorine concentration.

Gaseous chlorine has a very high degree of solubility in water and if flow of the chlorine to the water flow system continues after cessation of water flow through the system, a relatively large quantity of chlorine will be absorbed into the stationary volume of water within the system with a resultant formation of excessive and dangerous chlorine concentrations in the system. Another object of the invention, therefore, is the provision of chlorinating apparatus for introducing controlled quantities of chlorine into water flow systems, which apparatus becomes operative, upon the stoppage of water flow through the system, to prevent further flow of chlorine to the system.

To the end that the foregoing objects may be accomplished the invention features generally a vacuum feed for drawing chlorine solution and gaseous chlorine from a mixing chamber into the water flow system. Vacuum for the feed is created by and is a function of the rate of the flow of water through the system whereby the chlorine solution drawn into the system will vary with the rate of water flow through the system, and, moreover, upon the interruption of the vacuum for any reason, such as the cessation of water flow, injection of chlorine into the system will be terminated. Interruption of the vacuum also operates through a float control valve associated with the mixing chamber, to cause operation of a diaphragm-actuated chlorine flow control valve in the chlorine flow system to prevent further flow of chlorine through the latter system.

Chlorine for use in chlorinating systems is generally supplied in cylinders under substantial pressure whereby substantial valve operating forces are required to effect rapid and positive control of chlorine flow. Accordingly another object of the invention is the provision of a chlorinating system wherein the valves are operated by water pressure, rather than by vacuum as in the case of some prior art chlorinating systems, with a resultant decrease in the size and increase in the speed and positiveness of the response of such valves.

The corrosive effect of chlorine, and especially chlorine solutions, upon metallic elements is well known. A further object of the invention is, therefore, the provision of a chlorinating system, as in the foregoing, wherein the metallic parts, and especially valve components, contacted by chlorine are kept to a minimum and wherein further there is provided a vacuum relief arrangement for preventing the back flow of chlorine solution from the mixing chamber to the chlorine flow control valve through the chlorine feed lines due to the absorption of the chlorine remaining in the lines after shutting down of the chlorinating system.

Still a further object of the invention is the provision of a chlorinating system including a flow meter for indicating the rate of chlorine flow into the mixing chamber and hence the rate of chlorine injection into the water flow system.

The foregoing and other objects and advantages of the invention will become apparent to those skilled in the art, upon consideration of the following detailed description of the illustrative embodiment thereof, reference being had to the accompanying drawings wherein:

Fig. 2 is a sectional view of the injector assembly which operates upon water flow therethrough to produce the vacuum feed of the present chlorinating system;

Fig. 4 is a sectional view of a modified form of the chlorine flow control valve of the invention; and Fig. 5 is a sectional view of the mixing chamber, float control valve, and chlorine flow meter of the invention.

Figure 1:
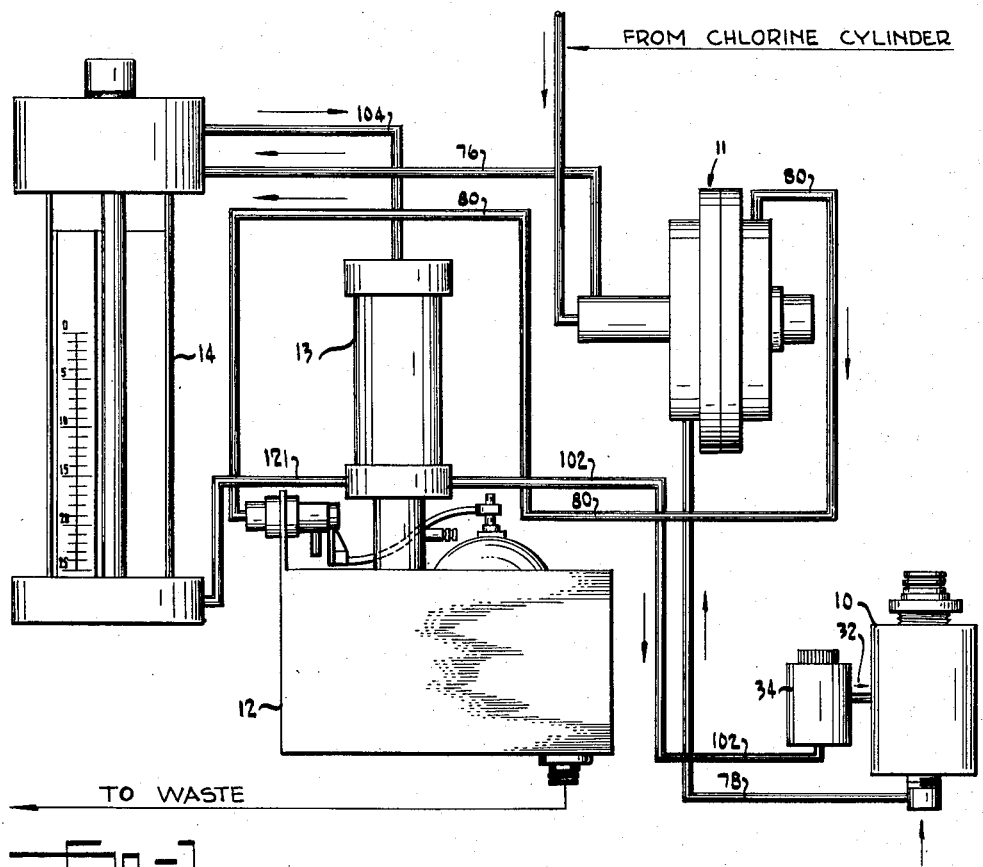
Fig. 1 is a diagrammatic showing of the chlorinating system comprising the illustrative embodiment of the present invention.

Referring now to the drawings and more particularly to Fig. 1, wherein the overall chlorinating system, comprising the illustrative embodiment of this invention, is shown in diagrammatic fashion, 10 denotes generally the injector assembly through which water to be chlorinated flows in the direction indicated, 11 denotes generally the diaphragm-actuated chlorine flow control valve, 12 denotes generally the float control valve assembly, 13 the mixing chamber, and 14 the chlorine flow meter.

Referring now to Fig. 2, injector assembly 10 comprises a body 20 formed with a bore 21 extending thereinto from one end, which bore 21 meets a larger bore 22 extending through the other end of the body, the bore 22 receiving a sleeve 23 and a hollow nipple 24. A conventional gasket 25 is disposed between the lower end of sleeve 23 and the shoulder at the juncture of bores 21 and 22. The lower end of bore 21 is adapted to be connected to a high pressure water supply (not shown) and nipple 24 is adapted to be joined to a conduit (not shown) for conveying the chlorine solution from injector 10 to a point of application of the solution. A packing nut 26, threaded in enlarged bore portion 22 and abutting a shoulder formed on nipple 24 serves to retain body 20, sleeve 23, and nipple 24 in assembled condition. Sleeve 23 has extending into one end thereof a bore 27 communicating at its lower end with bore 21 the bore 21 being continued by an enlarged bore, as shown, for receiving a venturi sleeve 28 formed with a restricted orifice 29. Venturi sleeve 28 has an external annular groove 30 which communicates with the low pressure side of orifice 29 by radial passages 31. Sleeves 23, 24 and 28, and packing 26 are preferably made of a material not subject to corrosion by chlorine solution. A nipple 32 is threaded into the side of body 20 and extends through the wall of sleeve 23 to communicate with groove 30, and this nipple communicates at its other end with the interior of a ball check valve 34. The latter comprises a housing 35, of a material not subject to corrosion by chlorine solution, having formed therein an inlet port 36. The juncture of the interior of housing 35 with inlet port 36 is formed with an inwardly facing valve seat 37 which, in the closed condition of the valve, is engaged by a ball 38 freely movable within the housnig. A removable plug 39 permits insertion of the ball into the housing and also acts to limit upward movement of the ball 38.

Figure 3:
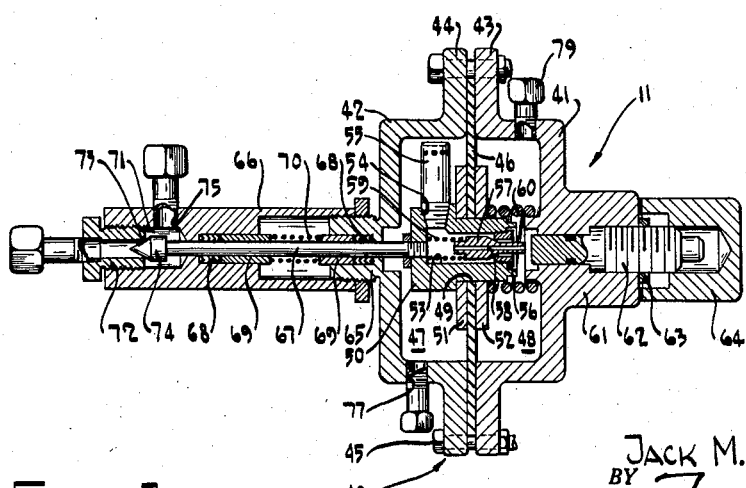
Fig. 3 is a sectional view of one form of the chlorine flow control valve of the invention.

Chlorine control valve 11 comprises, in the form thereof shown in Fig. 3, a housing 40 including a pair of opposed, generally cup-shaped portions 41 and 42 provided with flanges 43 and 44, respectively, through which bolts 45 extend for securing the portions 41 and 42 together. Clamped at its peripheral edge between flanges 43 and 44 is a flexible diaphragm 46 which divides the interior of housing 40 into two chambers 47 and 48. Diaphragm 46 has an opening 49 at its center for receiving a hub element 50 which is fixed to the diaphragm 46 as by a pair of disk-shaped members 51 and 52 disposed on opposite sides of diaphragm 46 and threaded on hub element 50. Hub element 50 has an axial bore 53 formed therein which opens at one end into chamber 48 and communicates at its other end with a radial passage 54 having fixed therein a nipple 55 communicating radial passage 54 with chamber 47 at a point adjacent the inner wall of housing portion 42. Axial bore 53, in hub element 50, is restricted at its right hand end by a sleeve member 56, threaded in bore 53, and which forms a valve seat for engagement by a generally conical-shaped nozzle valve 57 having a reduced passage 58 extending axially therethrough. A spring 59 serves to bias nozzle valve 57 into engagement with valve seat 56. Diaphragm 46 and the aforedescribed elements mounted thereon are biased to the left, as seen in Fig. 2, by a spring 60. Housing portion 41 is formed with a hub portion 61 which is axially bored and internally threaded to receive a threaded adjustable stop 62 which is retained in an axially adjusted position by means of a stop nut 63 threaded thereon. A cover 64 may be provided for protecting the exposed end of the stop 62, if desired. Stop 62 has its inner end projecting into chamber 48 for engagement, under certain conditions, as hereinafter set forth, with the end of nozzle valve 57.

Fixed to an axial boss 65 on housing portion 42 is an elongated valve housing 66 which boss and housing are axially bored to slidably receive a valve stem 67 having its right hand end, as viewed in the figure, fixed to hub element 50. A pair of packings 68, packing retainers 69, and a packing spring 70 serve to seal the valve stem to boss 65 and valve housing 66. Extending axially inwardly from the free end of valve housing 66 is a chamber 71 having threaded in its open end an axially bored member 72, the inner end of which defines a valve seat 73 for a needle valve 74 formed on the outer end of valve stem 67. A passage 75 extends radially through the wall of valve housing 66 into communication with chamber 71. Insert member 72 is, as shown in Fig. 1, communicated with a source of pressurized chlorine while passage 75 is communicated with a conduit 76 for conveying chlorine to other parts of the system, as will be seen.

Housing portion 42 is provided with an inlet port 77 which is communicated by a conduit 78 (Fig. 1) to the high pressure water supply and housing portion 41 is provided with an outlet port 79 which is communicated by a conduit 80 (Fig. 1) to the float control valve assembly, as will be hereinafter described.

It will be readily apparent from the foregoing description that the flow of water from inlet port 77 through passage 58 in nozzle valve 57 to outlet port 79 will produce a pressure differential between chambers 47 and 48 tending to move the center of diaphragm 46, together with hub portion 50, having valve stem 67 fixed thereto, to the right whereby to move needle valve 74 out of engagement with valve seat 73 and permit flow of chlorine from the pressurized source to conduit 76. It will further be seen that as the pressure differential across the diaphragm increases, nozzle valve 57 will finally engage stop 62 and be moved, against the action of spring 59, out of engagement with the valve seat formed by sleeve 56. The position of stop 62 is so adjusted that under normal operating conditions nozzle valve 57 will be just slightly unseated whereby water may flow therearound, through sleeve 56 and into chamber 48. In this position needle valve 74 will be fully open. An increase in the pressure differential across the diaphragm 46, from that existing under normal operating conditions, will act to produce further unseating of nozzle valve 57 from valve seat 56 whereby to permit greater water flow through the chlorine control valve to satisfy the demand of increased suction. The flow of chlorine gas remains substantially unchanged. Upon the stoppage of water flow through the chlorine control valve, under conditions hereinafter set forth, the pressure differential across the diaphragm will drop and the latter will, under the action of spring 60, be urged to the left with a resultant seating of nozzle valve 57 on its seat 56. Under such conditions of no water flow through the chlorine control valve, reduced passage 58 in nozzle valve 57 permits leakage of water from chamber 47 to chamber 48 whereby to permit equalization of the pressures across the diaphragm 46, and, therefore, seating of needle valve 74 on its valve seat 73 to shut off the flow of chlorine through the chlorine control valve. It is evident that adjustment of stop 62 effects a change in the deflection of the diaphragm 46, and hence a change in the opening of needle 74, for a given rate of water flow through the valve. The rate of chlorine flow for a given normal rate of water flow may thus be regulated somewhat.

The modified chlorine flow control valve 11' of Fig. 4 comprises the housing portions 41' and 42' having clamped therebetween the flexible diaphragm 46', fixed in the central opening 49' of which, as by nuts 51' and 52', is a hub element 50'. Formed in hub element 50' is an axial bore 53' which is communicated at one end with a radial passage 54' having fixed therein the nipple 55' communicating passage 54' with the high pressure chamber 47' of the pair of chambers 47' and 48' defined by the diaphragm 46', as in the case of the valve construction of Fig. 3. Slidably disposed within bore 53' of hub element 50' is an orifice sleeve 56' having an axial passage 57' opening at one end into passage 53' and communicated at its other end with low pressure chamber 48' by axially off-set, radial ports 58'. The end portion of orifice sleeve 56', having formed therein the ports 58', is of reduced external diameter, as shown, and is slidably received within a bore 59' formed in a cut-off sleeve 60' threaded in housing portion 41'. Fixed at one end to orifice sleeve 56' and extending slidably through sleeve 60' is an orifice sleeve actuator stem 61' which has its outer end threadedly engaged in a packing nut 62' threaded in sleeve 60' and serving to compress suitable packing 63'. The outer end of stem 61' is provided with an operating handle, as shown. The inner end portion of bore 59' in cut-off sleeve 60' is enlarged, as shown, and radial ports 64' provide communication between the enlarged portion of bore 59' and low pressure chamber 48'. A spring 65' serves to bias the diaphragm 46', and the elements supported thereby, to the left as viewed in the figure.

Threadedly fixed in and axially of housing portion 42' is a valve housing 66' having slidably mounted therein a valve stem 67' fixed at its inner end to the hub element 50'. Packing 68' and associated packing nuts 69' serve to provide a fluid tight seal between the stem 67' and the other parts of the valve. Formed in the outer end of valve housing 66' is a chamber 71' in which is fixed a nipple 72' adapted to be communicated to a source of pressurized chlorine and defining at its inner end a valve seat 73' for engagement with a needle valve on the end of valve stem 67'. A radially extending passage 75' opens into chamber 71' and is adapted for connection to the conduit 76 (Fig. 1) for conveying chlorine from the control valve to other parts of the system as will be seen.

Housing portion 42' of valve 11' is provided with an inlet port 77' for connection to the high pressure water line 78 (Fig. 1) and housing portion 41' is provided with an outlet port 79' for connection to the water line 80 (Fig. 1). From the foregoing it will be seen that water flowing from chamber 47' through ports or orifices 58' of the orifice sleeve 56' to the lower pressure chamber 48' will create a pressure differential between the chambers 47' and 48' with a resultant movement of the diaphragm 46' center to the right as seen in Fig. 4. Movement of the diaphragm to the right causes needle valve 74' to move away from valve seat 73' whereby chlorine gas may flow from the source of pressurized chlorine, not shown, to other parts of the system. It will also be apparent that by manual manipulation of orifice sleeve actuating stem 61', orifice sleeve 56' may be adjusted axially in bore 59' of cut-off sleeve 60' whereby to vary the total area of the ports 58' through which water may flow from the high pressure chamber 47' to the lower pressure chamber 48'. Decreasing such total port area, as by axially moving orifice sleeve 56' into bore 59' results in a greater restriction to water flow across the diaphragm and hence in a greater pressure differential across the diaphragm. Thus, it will be apparent that for a given water pressure in the line 78 (Fig. 1), the opening of the chlorine valve 73', 74' may be adjusted as desired to provide a desired chlorine flow rate by axial adjustment of the orifice sleeve 56' to produce such a pressure differential across the diaphragm as to give the desired opening of the chlorine valve. Moreover, a variation in suction within the working limits of the machine will cause a corresponding proportional variation in chlorine feed.

The float control valve assembly 12 comprises a valve casing 81 fixedly mounted on one wall of a float tank 82 and including an inlet passage 83 to which is connected the conduit 80 from the water outlet port 79, or 79', of the chlorine flow control valve. Passage 83 of valve casing 81 is restricted at its inner end, and formed therearound is a valve seat 84 for engagement by a plunger type valve body 85 slidably disposed within valve casing 81 whereby the flow of water through line 80 (Fig. 1) and hence the flow of water through the chlorine control valve 11 or 11' will be determined by the position of valve body 85 relative to its valve seat 84. Water flowing past the valve body 85 is conveyed to the float tank 82 by a conduit 86. Plunger valve 85 has formed therein an annular groove 87 for receiving the end of one arm of a lever 88 pivotally secured intermediate its ends to the valve casing 81 as at 89. The other arm of lever 88 is fixed to an arm 90 adjustably carrying at its free end a float 91 which floats in the water contained in tank 82 whereby an increase in the level of the water in tank 82 will act to move plunger valve 85 towards its closed position.

Supported on the bottom wall of tank 82 is a vertical cylindrical riser 92, the interior of which is communicated with tank 82 below the normal water level of the latter as by passages 93. Riser 92 has its interior vented to atmosphere adjacent its upper end, as by the vent pipe 94. This vent provides a pressure relief to atmosphere and would, in practice, extend above adjacent buildings so as to safely disperse the chlorine gas in the event of improper functioning of the shut-off valves. Riser 92 has fixed in its upper end a reducing collar 95 in the reduced opening of which is fixed a conduit 96 having its lower end extending below the surface of the water in tank 82. Also fixed in the reduced opening in collar 95 and extending upwardly therefrom is a second conduit 97 which has its upper end extending into the mixing chamber 13, the latter being defined by a bottom plate 98, supported by the riser 92 and encircling the conduit 97, a side wall, formed by a cylindrical shell 99 supported on the bottom plate 98, and an upper end wall, formed by a plate 100 supported on shell 99. These parts forming the mixing chamber are preferably made of material not subject to corrosion by chlorine.

The interior of mixing chamber 13 communicates, as by a vertical riser 101 and conduit 102, with the inlet port 36 of the check valve 34 whereby vacuum created by the flow of water through the venturi sleeve 28 (Fig. 2) will act to draw water from the float tank 82, through ports 93, and conduits 96 and 97 into the mixing chamber 13 to the height of the riser 101.

Upper end wall 100 of mixing chamber 13 has a passage 103 therethrough which is communicated with conduit 76, conveying chlorine from the chlorine flow control valve 11 or 11', through the chlorine flow meter 14, the details of which are hereinafter set forth, and conduit 104. Chlorine entering the mixing chamber 13 is absorbed into the water drawn into the chamber, in the manner heretofore set forth, and during normal operation of the system the resultant chlorine solution is drawn through riser 101, conduit 102, check valve 34 and is injected into the water stream flowing through injector 10. Upon shutting down of the system for any reason, the unabsorbed chlorine in the mixing chamber and in the chlorine lines connecting the mixing chamber with the chlorine flow control valve 11 or 11' would, owing to its high degree of solubility in water, be absorbed into the remaining water in the mixing chamber, producing in the system a vacuum which, if not broken, would cause water to be drawn up through the conduits 96 and 97 from the tank 82 into mixing chamber 13 and the conduits 76, 104 and thence into the chlorine valve 73, 74 or 73', 74'. Such back flow is undesirable owing to the extreme corrosive effect of chlorine solution on the metallic elements of the system and especially the chlorine valve 73, 74 or 73', 74'.

To prevent such back flow of chlorine solution, there is disposed in mixing chamber 13 a float 105 of plastic or other suitable material, not subject to corrosion by the chloride solution, which is fixed to one end of a shaft 106 extending through conduits 96 and 97 and having fixed on its lower end an upwardly opening cup-shaped member 107, adapted in a predetermined vertical position of the float 105, that is, when the float is positioned adjacent the upper end wall 100, to have its lip extend above the surface of the water in riser 92 whereby to limit the amount of water which can be drawn into chamber 13 as a result of the vacuum created by the absorption of chlorine remaining after shut down of the system. The parts are so proportioned that the water available to be drawn into chamber 13 is insufficient, together with the water normally in the chamber, to fill the latter whereby to prevent the aforedescribed back flow of chlorine solution.

Chlorine flow meter 14, which in essence is a manometer, comprises a block 108 having extending therethrough a passage 109 communicated at one end with a hollow transparent tube 110 the liquid level in which, as will be seen, is indicative of the rate of chlorine flow through the system. Fixed in the other end of passage 109 is an orifice tube assembly 111 comprising an orifice tube 112 having its lower end communicated with passage 109 and its upper end formed with a reduced orifice 113. Passage 109 is enlarged as shown at 114 and has fixed therein an inverted generally cup-shaped cover member 115, the internal diameter of which is somewhat larger than the orifice tube assembly 111 whereby to permit the flow of chlorine between the cover member 115 and the tube assembly 111. Sealing means may be provided, as shown, between the cover member 115 and the block 108. The reduced bore 109 communicates with a transverse passage 116, to which is connected the end of conduit 76 extending from the chlorine flow control valve. The enlarged portion 114 of bore 109 communicates with a transverse passage 117, to which is connected the end of the conduit 104 leading to the mixing chamber 13.

The lower end of the passage within tube 110 is communicated with bores 118 and 119 formed in a head block 120 sealed to the lower end of tube 110. Bore 119 is communicated through a conduit 121 and passages 122 and 123 in the lower end plate 98 of the mixing chamber, to the interior of the latter whereby there is formed in effect a manometer device having the tube 110 as one leg thereof and tube 121 and the mixing chamber, up to the level of discharge riser 101, as the other leg thereof. It will be seen from the foregoing that with chlorine flowing from conduit 76 through orifice 113 into mixing chamber 13 through conduit 104, the pressure differential across the orifice 113 will be a function of chlorine flow rate through the orifice. This pressure differential will be reflected in the height of the liquid column in tube 110. The deviation between the liquid level in the tube 110 when the system is inoperative, which level is indicated by the zero mark on the scale 124 associated with the tube and would correspond to the distance that the upper end of riser 101 is above passage 119 in head block 120, and the liquid level in the tube 110 when the system is in operation will, therefore, provide an indication of rate of chlorine flow into mixing chamber 13 and thus an indication of the rate of injection of chlorine into the water flowing through injector 10.

Operation of the present chlorinating system is as follows:

Upon the actuation of suitable valves, not shown, to deliver water under pressure to the injector 10, the water will flow through the venturi sleeve 28 and also through conduit 78 to the high pressure chamber of the chlorine control valve 11 or 11'. The flow of water through venturi sleeve 28 creates, at radial passages 31 of the sleeve, a vacuum which is transmitted through check valve 34, conduit 102, and riser 101 to the interior of the mixing chamber 13 with a resultant drawing of water into the mixing chamber from float tank 82 through conduits 96 and 97.

Simultaneously the flow of water to the chlorine control valve 11 or 11' through line 78 will result in the flow of water through the reduced passage 58 of the nozzle valve 57, in the case of control valve 11 shown in Fig. 3, or through the orifices 58', in the case of the modified control valve of Fig. 4, with the resultant creation of a pressure differential across the flexible diaphragms 46 or 46' of the valves. This pressure differential produces flexing of the diaphragm to the right, as viewed in the figures, whereby the needle valves 74 or 74' will be moved away from their valve seats 73 or 73' to permit the flow of chlorine from the supply of pressurized chlorine, not shown, into the mixing chamber 13 through conduit 76, chlorine flow meter 14 and conduit 104. Upon entering the mixing chamber, the chlorine is absorbed into the water drawn into the chamber from float tank 82 to produce a chlorine solution which together with some gaseous chlorine will be drawn through riser 101, conduit 102, check valve 34 and will be injected at ports 31 into the water stream in injector 10.

In those applications wherein the chlorine control valve of Fig. 3 is employed, namely, applications wherein a constant feed of chlorine gas is desired despite variations in the flow rate through injector 10, a separate needle valve, not shown, is preferably employed to regulate the rate of flow of chlorine into the mixing chamber 13, while in those applications wherein the modified chlorine control valve of Fig. 4 is employed, no separate control valve for regulating the rate of chlorine flow into the mixing chamber need be employed owing to the aforedescribed arrangement, comprising the adjustable orifice sleeve 56', for effecting control over the chlorine flow rate for any given water pressure at the high pressure end of the injector 10. Variations in the rate of water flow through the injector 10 are reflected in corresponding increases or decreases in the vacuum produced in riser 101 with a resultant corresponding variation in the rate at which chlorine solution and chlorine gas are withdrawn from the mixing chamber and injected into the water stream in injector 10. Moreover, during normal operation variations in water pressure at the injector intake, producing corresponding variations in rate of water flow through the injector, will result in proportional variations in the pressure differential across the flexible diaphragm of the chlorine flow control valve whereby to effect a chlorine flow rate through the control valve 11' which, during normal operation, varies substantially in accordance with flow rate of water through the injector.

Upon the failure of the vacuum at injector 10 for any reason, such as substantial reduction in the rate of flow of water through the injector or the complete cessation of water flow through the injector 10 due to an obstruction in orifice 29, the rate at which water is drawn into mixing chamber 13 from float tank 82 will be substantially diminished or reduced to zero with a resultant rising of the water level in the tank due to the inflow of water through conduit 80 and valve 85 from the low pressure chamber of the chlorine control valve 11 or 11'. Increase in the water level of tank 82 results in the rising of float whereby valve 85 will be moved to its closed position in engagement with valve seat 84. Closing of valve 85 produces an equalization of the pressures on opposite sides of the flexible diaphragm in the chlorine control valves 11 or 11' whereby the diaphragm will be urged, under the action of springs 60 or 65', in a direction to close the needle valves 73, 74 or 73', 74' and thus prevent any further flow of chlorine through the system. As previously described, the vacuum relief assembly comprising the float 105, shaft 106, and cup member 107, becomes operative upon shutting down of the system for any reason, to prevent the back flow of chlorine solution from the mixing chamber 13 into the chlorine flow lines 76 and 104 and thence to the chlorine flow control valves.

Blockage downstream of injector 10, resulting in substantial reduction or complete stoppage of water flow through the injector, will cause a reduction in the vacuum produced by the latter, or where flow substantially ceases, water will flow from the injector to check valve 34 to move ball 38 to its closed position. Water flowing into float tank 82, through chlorine control valve 11 or 11' will, as in the case of the aforedescribed blockage of injector orifice 29, effect closing of float control valve 85 to equalize the pressures across the diaphragms of the float control valves 11 or 11' and shut off the flow of chlorine to the mixing chamber 13.

Finally, in the event of blockage upstream of the injector, or failure of the water supply to the injector, water flow to the chlorine control valve 11 or 11' will cease with a resultant equalizing of the pressures across the diaphragms of such valves and shutting off of chlorine flow to the mixing chamber 13. Moreover, blockage upstream or downstream of the injector will result in an interruption of the vacuum feed and hence in a stoppage of chlorine solution flow from the mixing chamber to the injector.

It is to be understood that system and instrumentalities hereinbefore described and illustrated are for illustrative purposes only and that numerous modifications in design and arrangement may be made without departing from the spirit and scope of the following claims:

I claim:

1. A valve for controlling the flow of a first fluid in response to the rate of flow of a second fluid comprising a valve assembly for controlling the flow of said first fluid, and means responsive to the rate of flow of said second fluid for actuating said valve assembly, said last named means including conduit means for transmission of said second fluid, diaphragm means operatively connected to said valve assembly and including means forming a restricted opening through which said second fluid flows whereby to divide said conduit means into high and low pressure sides, deflection of said diaphragm means toward said low pressure side acting to open said valve assembly, means to adjust said first-mentioned means to adjust the opening of said valve means for a given rate of flow of the second fluid, and means for biasing the diaphragm means toward the high pressure side.

2. The subject matter of claim 1 wherein said means to adjust the first-mentioned means comprises means to adjust the size of said restricted opening.

3. The subject matter of claim 1 wherein said first-mentioned means also includes a spring biased valve element and valve seat therefor carried on said diaphragm means, the space between said element and seat when separated defining said restricted opening, and stop means engageable by said element to unseat the latter upon deflection of the diaphragm means toward the stop means, and said means to adjust said first-mentioned means comprising means to adjust the position of said stop means.

4. In fluid mixing apparatus, mixing chamber means, two separate flow systems connected to said chamber means for delivering different fluids to said chamber means for mixing therein, valve means in one of said flow systems for controlling fluid flow therein, operating means for said valve means including a hollow casing, a movable member within and sealed to said casing, there being a pair of chambers at opposite sides of the member and restricted passage means communicating said chambers, the other flow system comprising a first conduit communicating to one of said pair of chambers, a second conduit communicating the other of said pair of chambers to said mixing chamber means, fluid in said other flow system flowing from said first conduit, into said one chamber, through the restricted passage means, to the other chamber and thence through said second conduit to said mixing chamber means, said member being movable in response to the pressure differential between said chambers resulting from fluid flow through said restricted passage means, means connecting said member and valve means for opening of the latter in response to fluid flow to the chamber means through said other system, and means to adjust said operating means to regulate the rate of flow for a given rate of flow in the other system.

5. The subject matter of claim 4 wherein said last-mentioned means comprises means for adjusting the size of said restricted passage means.

6. The subject matter of claim 4 wherein said operating means also includes a spring biased valve element and a valve seat therefor carried on said member, the space between said element and seat when separated defining said restricted passage means, and stop means engageable by said element to unseat the latter upon movement of said member toward the stop means, and said means to adjust said operating means comprising means to adjust the position of said stop means.

7. In fluid mixing apparatus, an upright mixing chamber closed at its upper end and open at its lower end, a tank into which the lower end of said chamber extends, a first flow system connected to the chamber for delivering a first fluid to the chamber, a second flow system for discharging a second fluid into said tank, conduit means leading from the chamber, said conduit means being adapted for connection to a vacuum source for drawing fluid from the tank into the chamber for mixing with said first fluid, and for drawing fluid mixture from the chamber through said conduit means, float controlled valve means in said second flow system responsive to the fluid level in said tank for cutting off flow of said second fluid to the tank in response to the fluid level in the tank rising to a given level, and means in said flow systems for cutting off fluid flow in said first flow system in response to termination of fluid flow in said second flow system.

8. The subject matter of claim 7 including fluid conductor means through which a main fluid stream is adapted to flow, aspirator means in said conductor means connected to said conduit means for producing a vacuum in response to flow of said stream through the aspirator means to draw fluid mixture from the chamber and inject the fluid mixture into said stream, said second flow system connecting to said conductor means for flow of fluid from said conductor means to the chamber through said second flow system.

References Cited in the file of this patent

UNITED STATES PATENTS

| | | |
|---|---|---|
| 1,283,993 | Wallace et al. | Nov. 5, 1918 |
| 1,799,453 | Blundon | Apr. 7, 1931 |
| 2,016,331 | Junkers | Oct. 8, 1935 |
| 2,054,798 | Gibson | Sept. 22, 1936 |
| 2,065,538 | Heitzmann | Dec. 29, 1936 |
| 2,260,936 | Everson | Oct. 28, 1941 |
| 2,300,642 | Booth | Nov. 3, 1942 |
| 2,315,512 | Everson | Apr. 6, 1943 |
| 2,352,584 | Ziebolz et al. | June 27, 1944 |
| 2,529,252 | Harper | Nov. 7, 1950 |
| 2,554,772 | Bereman | May 29, 1951 |
| 2,645,240 | Drake | July 14, 1953 |
| 2,671,756 | Everson | Mar. 9, 1954 |
| 2,695,626 | Riche | Nov. 30, 1954 |